US008516059B1

United States Patent
Singh et al.

(10) Patent No.: US 8,516,059 B1
(45) Date of Patent: Aug. 20, 2013

(54) SYSTEM, METHOD, AND COMPUTER PROGRAM PRODUCT FOR COMMUNICATING AUTOMATIC RESPONSE MESSAGES BASED ON A POLICY

(75) Inventors: Manish Singh, Bangalore (IN); Srikanth Chowdary Marri, Bangalore (IN); Rajesh Shinde, Hyderabad (IN)

(73) Assignee: McAfee, Inc., Santa Clara, CA (US)

( * ) Notice: Subject to any disclaimer, the term of this patent is extended or adjusted under 35 U.S.C. 154(b) by 482 days.

(21) Appl. No.: 12/195,069

(22) Filed: Aug. 20, 2008

(51) Int. Cl.
*G06F 15/16* (2006.01)

(52) U.S. Cl.
USPC ............................ 709/206; 709/204; 709/207

(58) Field of Classification Search
USPC .................................................. 709/204–207
See application file for complete search history.

(56) References Cited

U.S. PATENT DOCUMENTS

| 6,282,565 | B1 * | 8/2001 | Shaw et al. | 709/206 |
|---|---|---|---|---|
| 6,460,050 | B1 * | 10/2002 | Pace et al. | 1/1 |
| 6,668,281 | B1 * | 12/2003 | Ayyadurai | 709/223 |
| 7,218,926 | B2 * | 5/2007 | Bocking et al. | 455/419 |
| 7,386,595 | B1 * | 6/2008 | Bloomer et al. | 709/206 |
| 7,688,850 | B2 * | 3/2010 | Fletcher et al. | 370/466 |
| 7,886,359 | B2 * | 2/2011 | Jones et al. | 726/26 |
| 2002/0016735 | A1 * | 2/2002 | Runge et al. | 705/14 |
| 2004/0133294 | A1 * | 7/2004 | Chen et al. | 700/110 |
| 2005/0021636 | A1 * | 1/2005 | Kumar | 709/206 |
| 2005/0076090 | A1 * | 4/2005 | Thuerk | 709/207 |
| 2005/0198173 | A1 * | 9/2005 | Evans | 709/206 |
| 2006/0075038 | A1 * | 4/2006 | Mason et al. | 709/206 |
| 2007/0130274 | A1 * | 6/2007 | Lee et al. | 709/206 |
| 2007/0192419 | A1 * | 8/2007 | Vuong et al. | 709/206 |
| 2011/0055334 | A1 * | 3/2011 | Tivyan | 709/206 |

OTHER PUBLICATIONS

Broersma, "'Out of office' messages turned into spam relays," Techworld, Feb. 26, 2008, http://www.techworld.com/security/news/index.cfm?newsID=11544&pagtype=all.

* cited by examiner

*Primary Examiner* — Minh-Chau Nguyen
(74) *Attorney, Agent, or Firm* — Wong, Cabello, Lutsch, Rutherford & Brucculeri, L.L.P

(57) ABSTRACT

A system, method, and computer program product are provided for communicating automatic response messages based on a policy. In use, use of an automatic message generator utilized for automatically responding to receipt of a first message using a second message is identified. Additionally, it is determined whether a characteristic of at least one of the first message and the second message violates a predetermined policy. Furthermore, the second message is conditionally communicated based on the determination.

24 Claims, 6 Drawing Sheets

SYSTEM, METHOD, AND COMPUTER PROGRAM PRODUCT FOR COMMUNICATING AUTOMATIC RESPONSE MESSAGES BASED ON A POLICY

FIELD OF THE INVENTION

The present invention relates to response messages, and more particularly to systems for communicating automatic response messages.

BACKGROUND

Traditionally, automatic response messages have been utilized for automatically responding to a first message with a second message. For example, electronic mail (email) message applications oftentimes allow for configuration of a message as an automatic reply to received messages. However, techniques allowing use of automatic response messages have conventionally exhibited various limitations, such as a lack of data leakage prevention associated with the automatic response messages, for example.

There is thus a need for addressing these and/or other issues associated with the prior art.

SUMMARY

A system, method, and computer program product are provided for communicating automatic response messages based on a policy. In use, use of an automatic message generator utilized for automatically responding to receipt of a first message using a second message is identified. Additionally, it is determined whether a characteristic of at least one of the first message and the second message violates a predetermined policy. Furthermore, the second message is conditionally communicated based on the determination.

DETAILED DESCRIPTION

Figure 1:
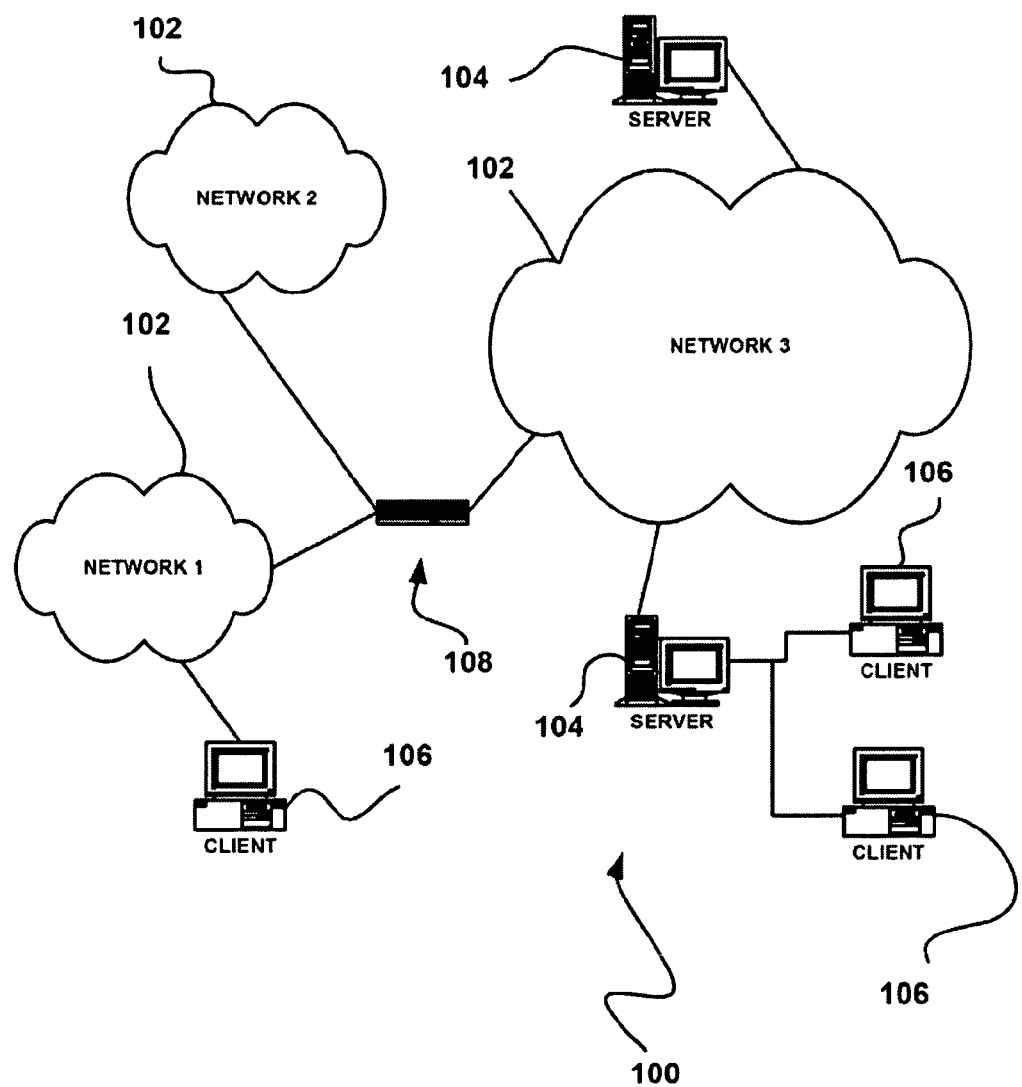
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
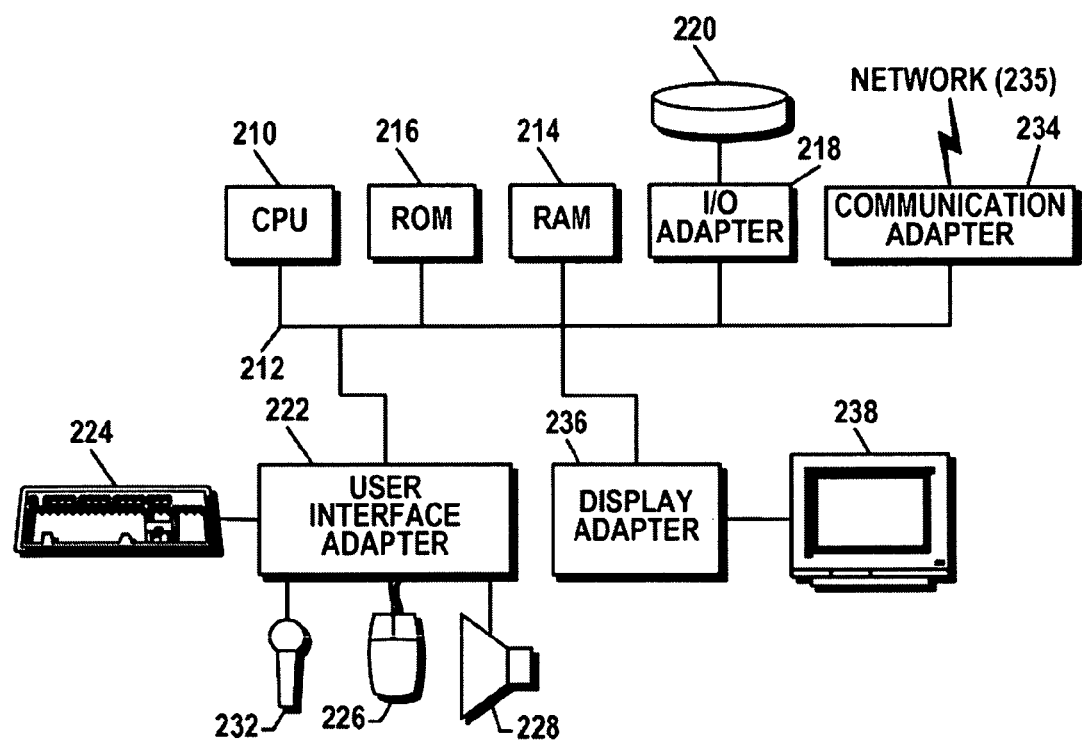
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
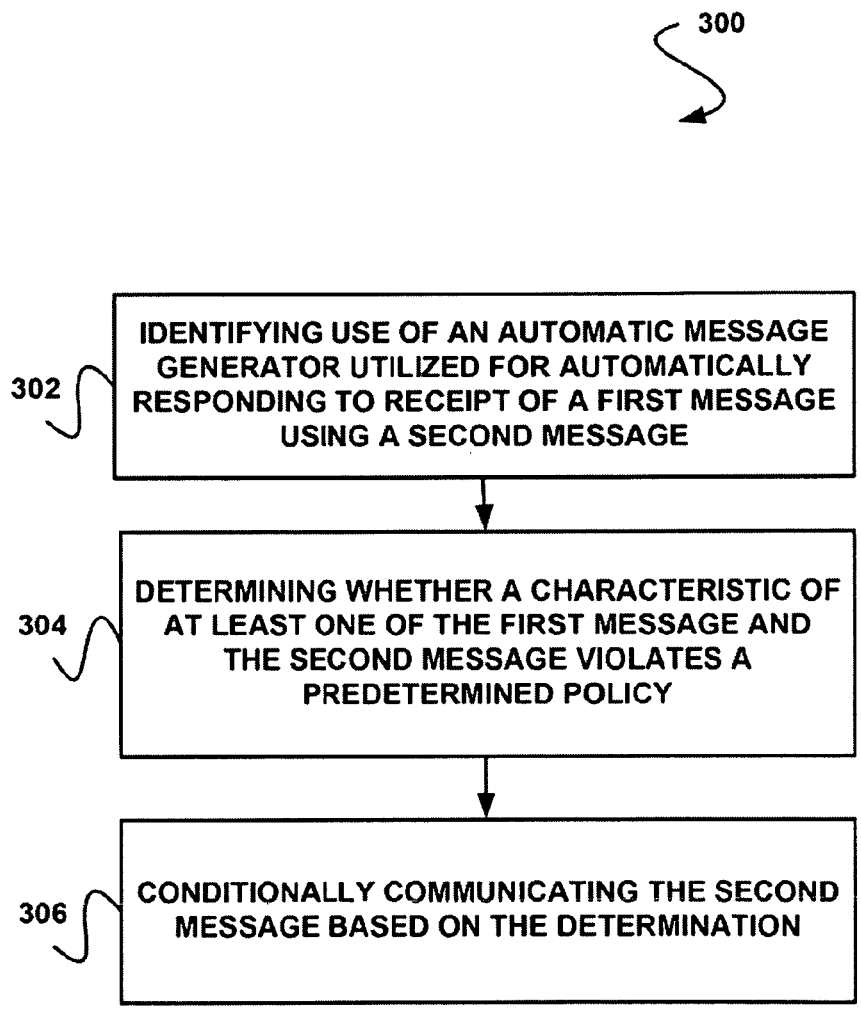
FIG. 3 shows a method for communicating an automatic response message based on a policy, in accordance with one embodiment.

FIG. 3 shows a method 300 for communicating an automatic response message based on a policy, in accordance with one embodiment. As an option, the method 300 may be carried out in the context of the architecture and environment of FIGS. 1 and/or 2. Of course, however, the method 300 may be carried out in any desired environment.

As shown in operation 302, use of an automatic message generator utilized for automatically responding to receipt of a first message using a second message is identified. With respect to the present description, the automatic message generator may include any code, application, module, etc. capable of being utilized for automatically responding to receipt of a first message using a second message is identified. For example, the automatic message generator may include a message manager application residing on a server (e.g. Microsoft® Exchange Server®), an automatic message generator feature which can be configure using an application (e.g. an out-of-office assistant, such as the Microsoft® Outlook® Out of Office Assistant), etc.

In one embodiment, the first message and/or the second message may include electronic messages. Thus, the first message and/or the second message may optionally include electronic mail (email) messages, short message service (SMS) messages, etc. Of course, however, the first message and/or the second message may include any desired type of messages in which the second message may be used to automatically respond to receipt of the first message.

In another embodiment, receipt of the first message may include receiving the first message at a message manager application. For example, the first message may be received by a device (e.g. such as any of the devices described above with respect to FIGS. 1 and/or 2) executing the message manager application. Optionally, the first message may be received from a remote message manager application (e.g. of a remote device). As another option, the first message may be received over a network.

In yet another embodiment, automatically responding to the receipt of first message using the second message may include replying to the first message using the second message in an automated manner. Just by way of example, in response to the receipt of the first message, the automatic message generator may be used to automatically communicate the second message as a reply to the first message. Accordingly, automatic message generator may optionally be used to automatically communicate the second message to the remote messaging application from which the first message is received.

As another option, the second message may be preconfigured. In various embodiments, the second message may be preconfigured by a user or automatically. As an example, the second message may be preconfigured by configuring content of the second message. As another example, the second message may be configured to include contact information (or any other personally identifiable information), an indication of a time frame during which the first message will not be viewed by a user, confidential information, etc.

Further, use of the automatic message generator may be identified in any desired manner. In one embodiment, use of the automatic message generator may be identified if an automatic message generator feature of a message manager application is enabled. To this end, use of the automatic message generator may optionally be identified if a user enables an automatic message generator feature of a message manager application.

For example, use of the automatic message generator may be identified in response to the user enabling the automatic message generator feature (e.g. out-of-office assistant) of the message manager application. Such automatic message generator feature may be enabled by the user selecting an option of the message manager application to allow the second message to be used as an automatic response to received messages, as an option.

In addition, as shown in operation 304, it is determined whether a characteristic of at least one of the first message and the second message violates a predetermined policy. With respect to the present description, the characteristic of the first message and/or the second message may include any desired aspect of the first message and/or the second message. For example, the characteristic may include a source of the first message (e.g. a domain from which the first message was received, etc.), at least one aspect of a sender of the first message (e.g. the domain of the sender, an address of the sender, etc.), a destination of the second message (a domain to which the second message is destined, etc.), at least one aspect of a receiver of the second message (e.g. the domain of the receiver, an address of the receiver, etc.), content of the first message and/or the second message, etc.

Further, the predetermined policy may include at least one rule utilized for managing communication of the second message, as described in more detail below with respect to operation 306. Optionally, the predetermined policy may indicate any characteristic(s) of the first message and/or the second message which is allowed or disallowed. As another option, the predetermined policy may be user-configurable.

In one embodiment, the predetermined policy may include a rule indicating that the second message (e.g. a body of the second message, a header of the second message, etc.) is not allowed to include predetermined content. The predetermined content may optionally include confidential content, links to confidential content, etc., such as personally identifiable content (e.g. a username, password, social security number, phone number, message address, etc.) for the sender of the second message and/or any other user (e.g. an associate of the sender, a manager of the sender, etc.). Thus, the predetermined policy may be violated when the second message includes the predetermined content.

In another embodiment, the predetermined policy may include a rule indicating that the second message is not allowed to be sent to a predetermined destination (e.g. domain). As an option, the predetermined destination may be included in a list of destinations to which the second message is not allowed to be sent. As another option, the predetermined policy may include a rule indicating that the second message is not allowed to be sent to a domain different from the domain from which the first message was received. Accordingly, the predetermined policy may be violated when the second message is to be sent to the predetermined destination (e.g. when a first domain from which the first message was received is different from a second domain of a recipient of the second message, etc.).

Of course, in yet another embodiment, the predetermined policy may include a rule indicating that the second message is only allowed to be sent to a predetermined destination (e.g. domain). The predetermined destination may be included in a list of destinations to which the second message is allowed to be sent (e.g. a contacts list included in the message manager application, etc.). To this end, the predetermined policy may be violated when the second message is to be sent to a destination different from the predetermined destination.

Still yet, the second message is conditionally communicated based on the determination, as shown in operation 306. In one embodiment, the second message may be communicated if it is determined that the predetermined policy is not violated. For example, if it is determined that the second message is destined for a predetermined destination allowed by the predetermined policy, does not include predetermined content disallowed by the predetermined policy, etc. the second message may be communicated (e.g. to the destination designated by the second message, etc.).

In another embodiment, the second message may not be communicated if it is determined that the predetermined policy is violated. Just by way of example, if it is determined that the second message includes predetermined content, is destined for a predetermined destination, etc. disallowed by the predetermined policy, the second message may be prevented from being communicated (e.g. to the destination designated by the second message, etc.) as an automatic response to the first message. Of course, however, the second message may be conditionally communicated based on the determination in any desired manner.

In this way, communication of the second message as an automatic response to the first message may be managed (e.g. controlled) based on a determination of whether a characteristic of the first message and/or the second message violate the predetermined policy. Managing the communication of the second message in this manner may optionally prevent data leakage via the second message. Just by way of example, confidential content and/or any other type of content undesired to be communicated (e.g. for data leakage prevention purposes) may be indicated by the predetermined policy, such that the second message may be prevented from being communicated if the second message includes such content thus violating the predetermined policy. As another example, a destination to which the second message is undesired to be communicated (e.g. for data leakage prevention purposes) be indicated by the predetermined policy, such that the second message may be prevented from being communicated if the second message is destined for such destination thus violating the predetermined policy.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
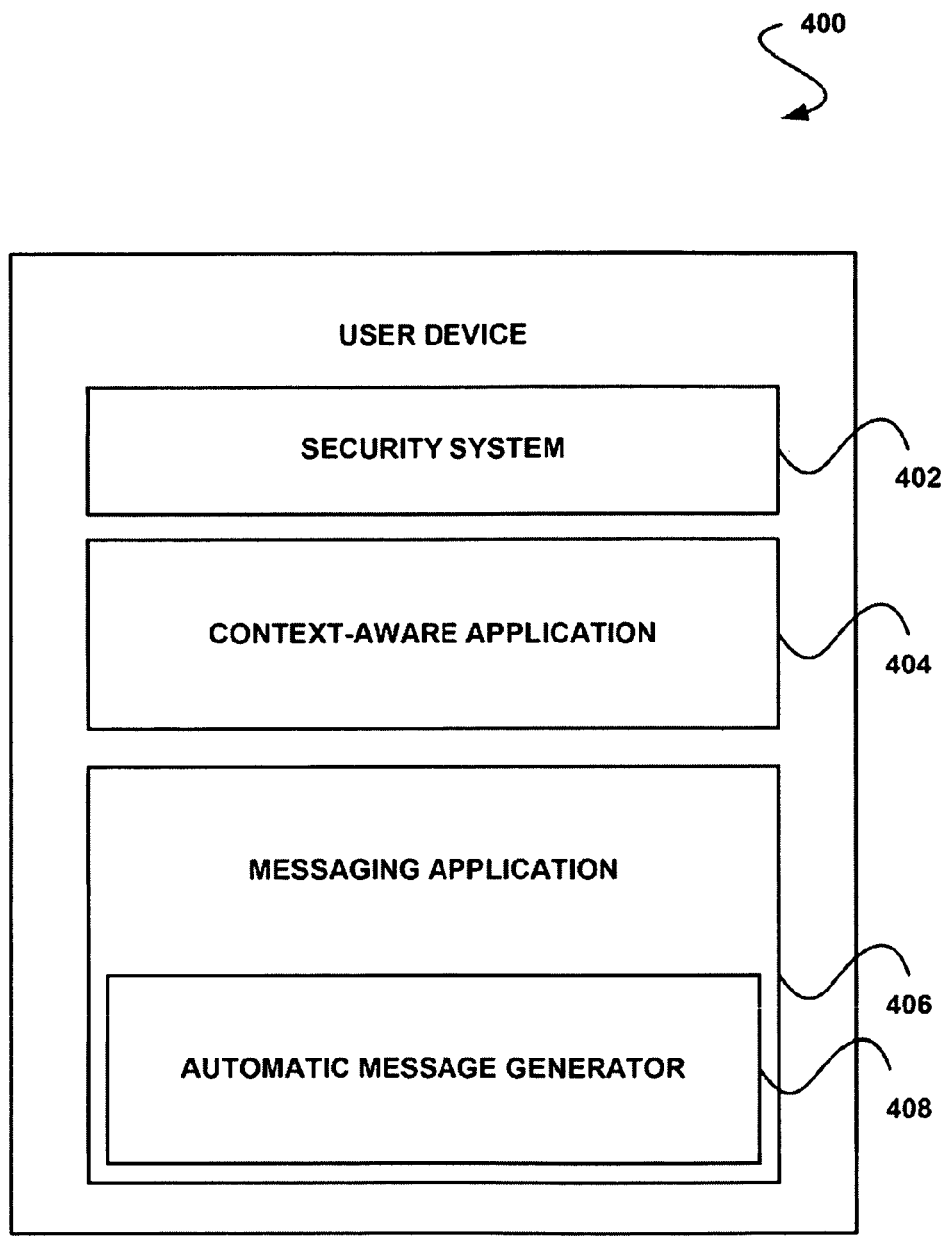
FIG. 4 shows a system for communicating an automatic response message based on a policy, in accordance with another embodiment.

FIG. 4 shows a system 400 for communicating an automatic response message based on a policy, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, the system 400 includes a user device. With respect to the present embodiment, the user device 400 may include any device capable of being utilized by a user for messaging purposes. Just by way of example, the user device 400 may include any of the client devices described above with respect to FIGS. 1 and/or 2.

To this end, the user device 400 includes a messaging application 406, such as a message manager application (e.g. for allowing the user to use the user device 400 for messaging purposes). In one embodiment, the messaging application 406 may include an application for sending and receiving messages (e.g. emails, etc.). For example, the messaging application 406 may include a message manager application. As another example, the messaging application 406 may include an interface for allowing the user of the user device 400 to generate messages, send messages to other devices, receive messages from other devices, etc.

As also shown, the messaging application 406 includes an automatic message generator 408 (e.g. an automatic message generator feature of the messaging application 406). With respect to the present embodiment, the automatic message generator is utilized for automatically responding to receipt of a first message using a second message. Thus, in response to receipt of a message by the message application 406 [e.g. from a remote device (not shown), etc.], the automatic message generator 408 may automatically reply to such message via a response message.

As an option, the interface of the messaging application 406 may allow the user to enable the automatic message generator 408 of the messaging application 406. For example, the user may enable the automatic message generator 408 when the user desires an automatic response message to be automatically sent as a response to a received message. As another option, the interface may allow the user to configure the automatic response message (e.g. generate the automatic response message, configure a content of the automatic response message, etc.) utilized for automatically responding to the received message.

As yet another option, the interface of the messaging application 406 may allow the user to disable the automatic message generator 408 of the messaging application 406. For example, the user may disable the automatic message generator 408 for preventing an automatic response message from being automatically sent as a response to a received message. In this way, the user may disable the automatic message generator 408 such that any messages received may be manually responded to by the user (e.g. the automatic response message may be prevented from being automatically sent).

Furthermore, the user device 400 includes a security system 402. The security system 402 may include any system capable of being utilized for securing the user device 400 (e.g. from unwanted activity, such as malware, etc.). In various embodiments, the security system 402 may include a firewall, an anti-virus application, a system for filtering unsolicited messages, etc.

In addition, the user device 400 includes a context-aware application 404. The context-aware application 404 may include an application for identifying use of the automatic message generator 408 (e.g. identifying when the automatic message generator 408 is enabled), determining whether a characteristic of a received message and/or an automatic response message used by the automatic message generator 408 violates a predetermined policy, and conditionally communicating the automatic response message based on the determination of whether a characteristic of a received message and/or an automatic response message used by the automatic message generator 408 violates the predetermined policy.

Optionally, the context-aware application 404 may be coupled with the security system 402. As another option, the context-aware application 404 may be integrated with the security system 402. Of course, as another option, the context-aware application 404 may be integrated with the messaging application 406.

To this end, the context-aware application 404 may monitor the automatic message generator 408 for identifying when the automatic message generator 408 is in use. In one embodiment, the context-aware application 404 may execute in an idle mode when the automatic message generator 408 is disabled. In another embodiment, the context-aware application 404 may execute in an active mode when the automatic message generator 408 is in use.

When the context-aware application 404 determines that the automatic message generator 408 is in use, the context-aware application 404 may continuously monitor messages received by the messaging application 406 (e.g. from a remote messaging server, etc.). For example, the context-aware application 404 may intercept messages received in an inbox (e.g. an inbox folder) of the messaging application 406.

Further, the context-aware application 404 may categorize messages based on the domain from which such messages are received. In this way, the context-aware application 404 may separate messages received from a domain different from the domain of the user device 400 from messages received from a domain that is the same as the domain of the user device 400. Of course, it should be noted that the context-aware application 404 may categorize the received messages based on any desired characteristic thereof.

Prior to delivering the categorized messages to the inbox of the messaging application 406, the context-aware application 404 may tag the messages based on the categorization. In one embodiment, the context-aware application 404 may tag the messages categorized as being received from a domain different from that of the user device 400. Optionally, the context-aware application 404 may tag each of such messages with an indicator of the domain from which the message was received. In this way, the context-aware application 404 may be capable of tracking each message according to the categorization thereof. Just by way of example, the context-aware application 404 may be capable of tracking each message received from a domain different from that of the domain of the user device 400.

Still yet, the context-aware application 404 may determine whether each received message violates a predetermined policy (e.g. of the security system 402, etc.) and/or whether the automatic response message to be sent as a reply to the received message violates the predetermined policy. As an option, the context-aware application 404 may utilize the categorization for determining whether each received message violates the predetermined policy. For example, the context-aware application 404 may apply the predetermined policy to the categorization of the received message, to the automatic response message, etc.

If a received message violates the predetermined policy and/or if the automatic response message to be sent as a reply to the received message violates the predetermined policy, the context-aware application 404 may terminate communication of the automatic response message used for responding to the receive message. Just by way of example, if the predetermined policy indicates that a message received from a domain different from that of the user device 400 violates the predetermined policy, the context-aware application 404 may terminate communication of the automatic response message to the device from which the message was received.

As another example, if the predetermined policy indicates that an automatic response message with a predetermined type of content violates the predetermined policy, the context-aware application 404 may terminate communication of the automatic response message to the device from which the message was received. If, however, a received message does not violate the predetermined policy and/or the automatic response message to be sent as a reply to the received message does not violate the predetermined policy, the context-aware application 404 may allow the automatic response message to be sent as a reply to the received message.

As an option, the context-aware application 404 may also alert a user of the user device 400 regarding a status of the automatic message generator 408. In one embodiment, the context-aware application 404 may alert the user regarding whether the automatic message generator 408 is in use (e.g. if the user enables the automatic message generator 408 of the messaging application 406, if the user disables the automatic message generator 408 of the messaging application 406, etc.). The alert may include an audio and/or visual message. For example, the alert may include a pop-up message. As another example, the visual message may be color-coded [e.g. may utilize red for indicating that the automatic message generator 408 is in use and a green color for indicating that the automatic message generator 408 is not in use (e.g. is disabled), etc.]. As an option, the alert may be user-configurable, such as a time in which the alert is presented, a length of time the alert is presented, the color coding of the alert, etc.

Thus, in one embodiment, if the automatic message generator 408 is disabled, the context-aware application 404 may send an alert message (e.g. to the inbox of the messaging application 406) informing the user that the automatic message generator 408 is not in use. In addition, the alert may include information regarding automatic response messages that were terminated during the last time the automatic message generator 408 was in use. For example, the information may include a destination to which each terminated automatic response message was to be sent. As an option, the alert may be sent to the user with an indicator that the alert is of high importance.

Figure 5:
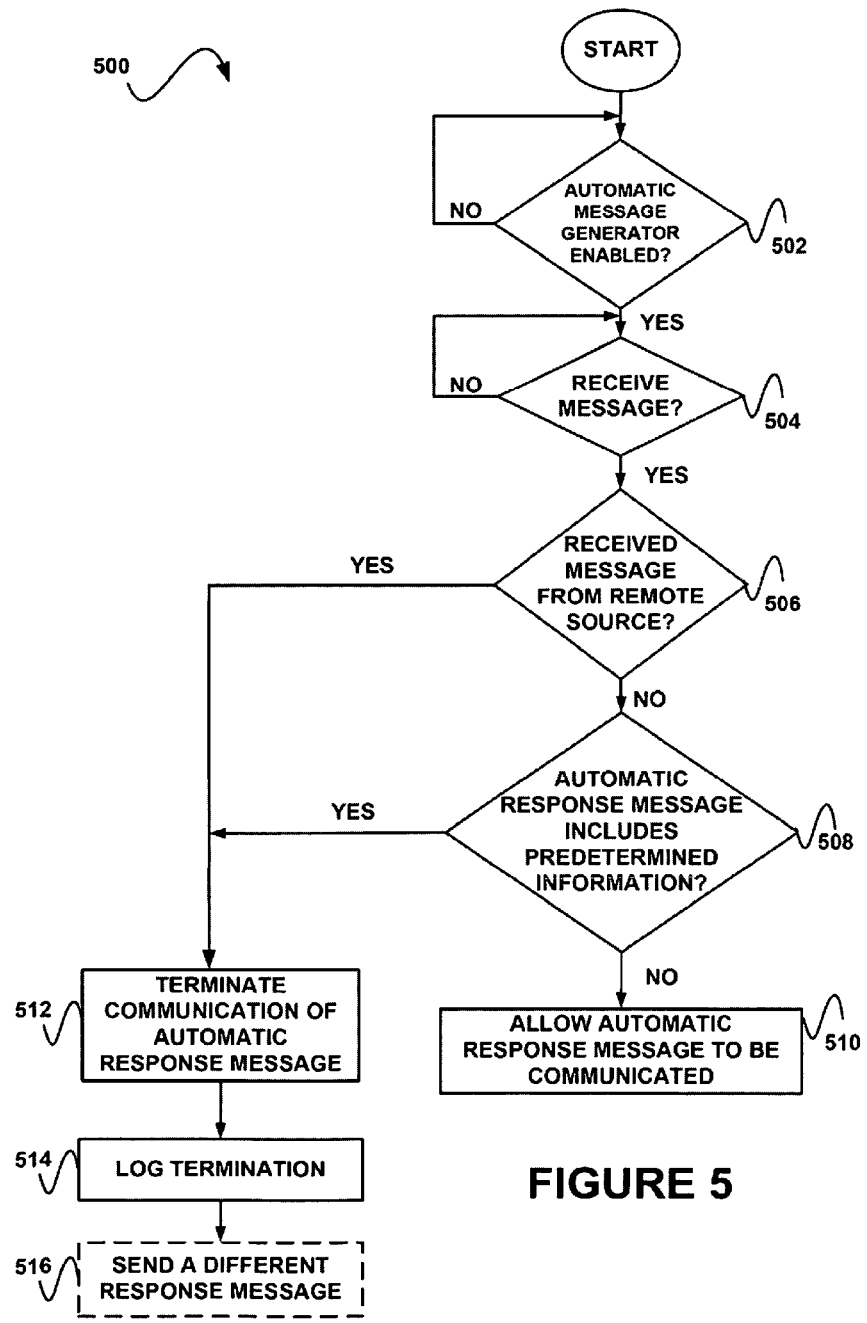
FIG. 5 shows a method for conditionally allowing communication of an automatic response message based on a destination and a content of the automatic response message, in accordance with yet another embodiment.

FIG. 5 shows a method 500 for conditionally allowing communication of an automatic response message based on a destination and a content of the automatic response message, in accordance with yet another embodiment. As an option, the method 500 may be carried out in the context of the architecture and environment of FIGS. 1-4. For example, the method 500 may be carried out using the content-aware application 404 of FIG. 4. Of course, however, the method 500 may be carried out in any desired environment. Again, it should be noted that the aforementioned definitions may apply during the present description.

As shown in decision 502, it is determined whether an automatic message generator is enabled. With respect to the present embodiment, the automatic message generator may be utilized for automatically responding to received messages with an automatic response message. For example, the automatic message generator may include the automatic message generator 408 of FIG. 4.

If it is determined that the automatic message generator is not enabled, the method continues to wait or the automatic message generator to be enabled. For example, a content-aware application 404 implementing the method 500 may execute in an idle mode until if it is determined that the automatic message generator is not enabled.

If, however, it is determined that the automatic message generator is enabled, it is determined whether a message is received. Note decision 504. In one embodiment, it may be determined whether a message is received by a message application of a device via which the method 500 is executed. In another embodiment, determining whether the message is received may include determining whether a message is attempted to be stored in an inbox of the message application (e.g. from a remote messaging server and/or any other remote device).

If it is determined that a message is not received, the method 500 continues to wait for a message to be received. As an option, after a predetermined period of time has elapsed (e.g. a timeout has occurred, etc.), the method 500 may return to decision 502 to determine whether the automatic message generator is still enabled. If it is determined that a message is received, it is determined whether the message is received from a remote source. Note decision 506. With respect to the present embodiment, the remote source may include any source that is located in a domain separate from that in which the message is received (e.g. domain separate from the messaging application via which the message is received). In this way, it may optionally be determined whether the message is received from an outside network.

If it is determined that the message is not received from a remote source, it is further determined whether an automatic response message includes predetermined information, as shown in decision 508. Such automatic response message may include a message utilized for automatically responding to the received message. Additionally, the predetermined information (e.g. confidential information, etc.) may be indicated by a predetermined policy. To this end, determining that the automatic response message includes predetermined information may include determining that the automatic response message violates the predetermined policy.

If it is determined that the automatic response message does not include the predetermined information, the automatic response message is allowed to be communicated. Note operation 510. In one embodiment, the automatic response message may be communicated as a response to the received message. Thus, the automatic response message may be communicated to the source of the received message.

If, however, it is determined that the received message was received from a remote source (decision 506) or if it is determined that the automatic response message includes the predetermined information (decision 508), communication of the automatic response message is terminated, as shown in operation 512. Accordingly, the automatic response message may be prevented from being communicated as a response to the received message (e.g. for preventing data leakage via the automatic response message, etc.).

Furthermore, the termination of the communication of the automatic response message is logged, as shown in operation 514. In various embodiments, the termination may be logged such that the received message may be logged, a source (e.g. email address) from which the message was received may be logged, a destination of the automatic response message may be logged, etc. Of course, however, any information associated with the termination of the communication of the automatic response message may be logged.

As an option, the termination may be logged in a database, a file, etc. The logged termination may therefore be accessed by a user (e.g. of the messaging application via which the message was received, etc.). For example, the user may use the logged termination for determining whether to manually respond to the received message. It should also be noted that received messages for which automatic response messages are not terminated may also be logged, as an option.

To this end, it may be determined whether the automatic response message is terminated (e.g. is not communicated). Thus, if it is determined that the automatic response message is terminated, the received message to which the automatic response message was a reply may be stored in a location where such received message may be capable of being reviewed by a user. As another option, if it is determined that the automatic response message is terminated, the received message may be stored in a location separate from a location in which other received messages are stored. For example, the received message may be stored in a folder of the messaging application that is separate from an inbox of the messaging application.

Still yet, a different response message may optionally be sent (see optional operation 516). Just by way of example, the different response message may be automatically sent in place of the terminated automatic response message. In this way, if it is determined that the automatic response message is not communicated, a different response message may be communicated.

In one embodiment, the different response message may be user-configured (e.g. configured by an administrator, etc.). In another embodiment, the different response message may include a default response message (e.g. a generic response message, etc.). In still yet another embodiment, the different response message may include less information than the automatic response message that was terminated. For example, the different response message may exclude the predetermined information that may be determined to be included in the automatic response message in decision 508. Moreover, if the different response message is sent, the destination of such automatic response message may be logged with a log indicating the termination of the automatic response message.

Figure 6:
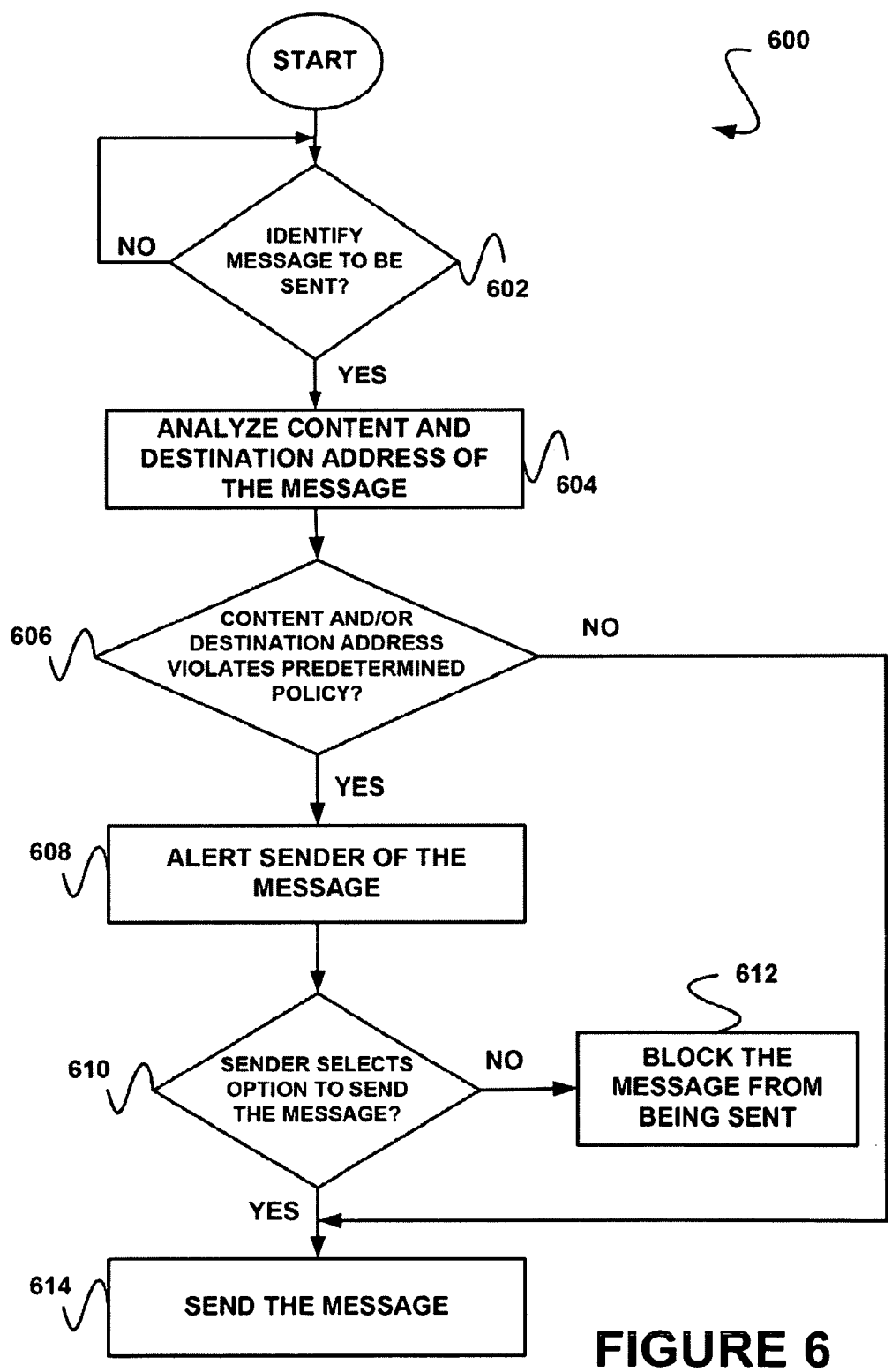
FIG. 6 shows a method for conditionally allowing a message to be sent based on a destination and/or a content of the message, in accordance with still yet another embodiment.

FIG. 6 shows a method 600 for conditionally allowing a message to be sent based on a destination and/or a content of the message, in accordance with still yet another embodiment. As an option, the method 600 may be carried out in the context of the architecture and environment of FIGS. 1-5. For example, the method 600 may be carried out using the content-aware application 404 of FIG. 4. Optionally, the method 600 may be carried out when the content-aware application 404 of FIG. 4 is in an idle mode. Of course, however, the method 600 may be carried out in any desired environment. It should also be noted that the aforementioned definitions may apply during the present description.

As shown in decision 502, it is determined whether a message to be sent is identified. In one embodiment, the message to be sent may include any message designated to be sent remotely. For example, the message to be sent may include a message to be sent to a remote device, a remote messaging application, etc. As an option, the message to be sent may be identified in response to composition of the message by a user, storing the message in a predetermined folder (e.g. drafts folder) of a messaging application, etc.

If it is determined that a message to be sent is not identified, the method 600 continues to wait for identification of a message to be sent. If, however, it is determined that a message to be sent is identified, content and a destination address of the message is analyzed. Note operation 604. The content may include any data included in a body of the message, a header of the message, attached to the message, etc. Additionally, the destination address of the message may include any address to which the message is destined.

Furthermore, it is determined whether the content and/or the destination address violate a predetermined policy, as shown in decision 606. The predetermined policy may include at least one rule indicating content and/or a destination address to which messages may and/or may not be sent. For example, the predetermined policy may indicate that confidential information (e.g. user identifiers, passwords, links internal to an organization, etc.) is not to be communicated to destination addresses in a domain separate from the domain from which the message is to be sent. Optionally, the predetermined policy may be user-configured.

In one embodiment, determining whether the content and/or the destination address violates the predetermined policy may include applying the predetermined policy to the content and/or the destination address of the message, comparing information in the predetermined policy to the content and/or the destination address of the message, etc. If it is determined that the content and/or the destination address does not violate the predetermined policy, the message is sent. Note operation 614. For example, the message may be sent to the destination address of the message.

If however, it is determined that the content and/or the destination address violates the predetermined policy, a sender of the message is alerted, as shown in operation 608. For example, an alert may be presented to the sender via the device utilized by the sender to send to the message. The alert may include any information indicating that the message violates the predetermined policy. As an option, the alert may identify the content and/or destination address of the message that violates the predetermined policy.

Still yet, as shown in decision 610, it is determined whether the sender selects an option to send the message. In one embodiment, the option may be included with the alert (e.g. on an interface via which the alert is displayed, etc.). If the sender selects the option to send the message, the message is sent (operation 614). For example, the message may be sent with the content and/or the destination address that violates the predetermined policy.

If, however, the sender does not select the option to send the message (e.g. if a predetermined period of time elapses in which the sender does not select the option to send the message, if the sender selects an option to not send the message, etc.), the message is blocked from being sent. Note operation 612. For example, the message may be prevented from being sent to the destination designated by the message.

Optionally, it may be determined (in decision 606) that the message includes a plurality of destination addresses, at least a portion of which violate the predetermined policy and at least another portion of which do not violate the predetermined policy. To this end, the sender may be alerted (in operation 608) that a portion of the destination addresses violate the predetermined policy. Further, the sender may select which destination address to which the message is to be sent (e.g. via the alert).

Of course, as another option (not shown), the message may be automatically blocked from being sent to the destination addresses that violate the predetermined policy. Moreover, blocking of the automatic response message to any of the destination addresses may optionally be logged.

To this end, a message to be communicated may be identified, and it may be determined whether a characteristic of the message violates the predetermined policy. As shown in the method 600, the characteristic may include content of the message and/or a destination of the message, but of course it should be noted that the characteristic may include any desired aspect associated with the message. Further, the message may be conditionally communicated based on the determination (e.g. may be communicated if the characteristic does not violate the predetermined policy, may be blocked from being communicated if the characteristic violates the predetermined policy, etc.).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium comprising instructions stored thereon to configure a processor to:
   identify use of an automatic message response generator feature utilized for automatically responding to receipt of a first message using a second message;
   make a first determination of whether a first characteristic of at least one of the first message body and the second message body violates a first predetermined policy, wherein the first determination is made based on the identified use of the automatic message response generator feature; and
   communicate the second message based on the first determination, wherein the second message is not communicated if the first determination indicates a violation of the first predetermined policy.

2. The computer program product of claim 1, wherein the instructions to configure a processor to determine whether a first characteristic of the second message violates a first predetermined policy include instructions to configure the processor to use at least one rule indicating whether or not the second message is allowed to include content and a destination address to which the second messages is allowed or disallowed to be sent.

3. The computer program product of claim 2, further comprising instructions to configure the processor to alert a sender of the second message, if the first determination indicates a violation of the first predetermined policy.

4. The computer program product of claim 3, wherein the instructions to configure the processor to alert a sender of the second message include instructions to configure the processor to include, with the alert, a selectable option to send the second message.

5. The computer program product of claim 4, wherein the second message is sent if the selectable option is selected by the sender.

6. The computer program product of claim 1, further comprising instructions to configure a processor to determine whether the second message was not communicated.

7. The computer program product of claim 6, wherein the instructions to configure a processor to determine whether the second message was not communicated includes instructions to configure the processor to store the first message in a first location where the first message is capable of being reviewed by a user if it is determined the second message was not communicated.

8. The computer program product of claim 7, wherein the instructions to configure a processor to store the first message in a first location include instructions to configure the processor to store other received messages in a location different from the first location.

9. The computer program product of claim 6, wherein the instructions to configure a processor to determine whether the second message was not communicated include instructions to configure the processor to communicate a third message if it is determined the second message was not communicated.

10. The computer program product of claim 9, wherein the third message includes less information than the second message.

11. The computer program product of claim 1, wherein the instructions to configure a processor to identify use of an automatic message generator feature comprise instructions to configure the processor to identify whether the automatic message response generator feature of a message manager application is enabled.

12. The computer program product of claim 11, wherein the automatic message response generator feature includes an out-of-office assistant feature.

13. The computer program product of claim 11, further comprising instructions to configure a processor to display an alert if the automatic message response generator feature of the message manager application was identified as enabled.

14. The computer program product of claim 1, further comprising instructions to configure a processor to:
   make a second determination of whether a second characteristic of at least one of the first message and the second message violates a second predetermined policy wherein the second characteristic includes a domain from which the first message was received; and
   forgo communication of the second message when the second determination indicates a violation.

15. The computer program product of claim 14, wherein the instructions to configure a processor to make a second determination of whether a second characteristic of at least one of the first message and the second message violates a second predetermined policy include computer instructions to configure the processor to determine the second predetermined policy is violated when a first domain from which the first message was received is different from a second domain of a recipient of the second message.

16. The computer program product of claim 14, wherein the first predetermined policy and the second predetermined policy comprise a single predetermined policy.

17. The computer program product of claim 1, wherein the first message and the second message include electronic mail messages.

18. The computer program product of claim 1, further comprising instructions to configure a processor to:
   determine whether a second characteristic of at least one of the first message and the second message violates a second predetermined policy wherein the second characteristic includes at least one aspect of a sender of the first message; and forgo communication of the second message when the second determination indicates a violation of the second predetermined policy.

19. The computer program product of claim 1, further comprising instructions to configure a processor to:

determine whether a second characteristic of at least one of the first message and the second message violates a second predetermined policy wherein the second characteristic includes a domain to which the second message is destined; and forgo communication of the second message when the second determination indicates a violation of the second predetermined policy.

20. The computer program product of claim 1, wherein the instructions to configure a processor to determine whether a first characteristic of the second message body violates a first predetermined policy include instructions to configure the processor to determine that the first predetermined policy is violated when the second message body includes confidential content, wherein the second message body comprises content intended to be sent via the automatic response generator feature.

21. The computer program product of claim 1, wherein the first predetermined policy comprises a user-configurable policy.

22. The computer program product of claim 1, further comprising instructions to configure a processor to:

categorize the first message based on a first domain from which the first message is received if the first domain is different from a second domain of a device at which the first message is received; and tag the first message based on the categorization, wherein the categorization is performed prior to the first message being delivered to an inbox of a messaging application of the device, wherein said tag is used to track the first message received from the first domain that is different from the second domain.

23. A method, comprising:

identifying, utilizing a hardware processor, use of an automatic message response generator feature utilized for automatically responding to receipt of a first message using a second message;

determining whether a characteristic of at least one of the first message body and the second message body violates a predetermined policy, the determining based on the identified use of the automatic response generator feature; and communicating the second message based on the determination, wherein the second message is not communicated if the predetermined policy is determined to have been violated.

24. A system, comprising:

a hardware processor; and a memory operatively coupled to the hardware processor, the memory having stored therein computer code for causing the hardware processor to perform the method of claim 23.

* * * * *

UNITED STATES PATENT AND TRADEMARK OFFICE
CERTIFICATE OF CORRECTION

PATENT NO.        : 8,516,059 B1                                Page 1 of 1
APPLICATION NO.   : 12/195069
DATED             : August 20, 2013
INVENTOR(S)       : Manish Singh et al.

It is certified that error appears in the above-identified patent and that said Letters Patent is hereby corrected as shown below:

In the Claims

In column 12, line 9, in claim 7, delete "includes" and insert -- include --, therefor.

Signed and Sealed this
Seventeenth Day of December, 2013

Margaret A. Focarino
*Commissioner for Patents of the United States Patent and Trademark Office*